US011726533B2

(12) United States Patent
Gale et al.

(10) Patent No.: US 11,726,533 B2
(45) Date of Patent: Aug. 15, 2023

(54) DATA STORAGE LIBRARY WITH SERVICE MODE FOR PROTECTING DATA STORAGE DRIVES

(71) Applicant: International Business Machines Corporation, Armonk, NY (US)

(72) Inventors: Ernest S. Gale, Tucson, AZ (US); Brian G. Goodman, Tucson, AZ (US); Icko E. T. Iben, Santa Clara, CA (US); Leonard G. Jesionowski, Tucson, AZ (US); James M. Karp, Tucson, AZ (US); Michael P. McIntosh, Tucson, AZ (US); Shawn M. Nave, Tucson, AZ (US); Lee C. Randall, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/948,845

(22) Filed: Sep. 20, 2022

(65) Prior Publication Data

US 2023/0016829 A1    Jan. 19, 2023

Related U.S. Application Data

(60) Division of application No. 16/718,526, filed on Dec. 18, 2019, now Pat. No. 11,500,430, which is a
(Continued)

(51) Int. Cl.
*G06F 3/06* (2006.01)
*G06F 1/18* (2006.01)

(52) U.S. Cl.
CPC ............ *G06F 1/182* (2013.01); *G06F 3/0604* (2013.01); *G06F 3/0634* (2013.01); *G06F 3/0658* (2013.01); *G06F 3/0686* (2013.01)

(58) Field of Classification Search
None
See application file for complete search history.

(56) References Cited

U.S. PATENT DOCUMENTS 4,831,476 A    5/1989  Branc et al.
4,838,911 A    6/1989  Robertson
(Continued)

FOREIGN PATENT DOCUMENTS

CN    102192631 A    9/2011
CN    102407663 A    4/2012
(Continued)

OTHER PUBLICATIONS

Frachtenberg E. et al., "Thermal Design in the Open Compute Datacenter", Thermal and Thermomechanical Phenomena in Electronic Systems (ITherm), 13th IEEE I22012 (May 30-Jun. 1, 2012).
(Continued)

*Primary Examiner* — Scott C Sun
(74) *Attorney, Agent, or Firm* — Scully, Scott, Murphy & Presser, P.C.

(57) ABSTRACT

A data storage library system includes a data storage library, at least one environmental conditioning unit, at least one data storage drive retained within the data storage library, and at least one access door for providing access to an interior portion of the data storage library. The system also includes a library controller, wherein the library controller is configured to initiate a service mode prior to and during a service procedure performed within the data storage library, and further wherein at least one operational state within the at least one data storage drive is changed during the service mode. The change in the at least one operational state may be, for example, an increase in temperature within the at
(Continued)

least one data storage drive, or the insertion of a data storage cartridge into the at least one data storage drive during the service mode.

20 Claims, 12 Drawing Sheets

Related U.S. Application Data continuation of application No. 15/460,497, filed on Mar. 16, 2017, now Pat. No. 10,566,023.

(56) References Cited

U.S. PATENT DOCUMENTS

| | | | |
|---|---|---|---|
| 5,278,708 A | 1/1994 | Apple et al. |
| 5,449,229 A | 9/1995 | Aschenbrenner et al. |
| 5,940,354 A | 8/1999 | Inoue |
| 6,347,020 B1 | 2/2002 | Carpenter et al. |
| 6,366,982 B1 | 4/2002 | Suzuki et al. |
| 6,409,450 B1 | 6/2002 | Ostwald et al. |
| 6,457,928 B1 | 10/2002 | Ryan |
| 6,467,285 B2 | 10/2002 | Felder et al. |
| 6,478,524 B1 | 11/2002 | Malin |
| 6,494,663 B2 | 12/2002 | Ostwald et al. |
| 6,537,013 B2 | 3/2003 | Emberty et al. |
| 6,563,771 B1 | 5/2003 | Debiez |
| 6,661,596 B2 | 12/2003 | Chliwnyj et al. |
| 6,676,026 B1 | 1/2004 | McKinley et al. |
| 6,676,505 B2 | 1/2004 | Behl |
| 6,854,275 B2 | 2/2005 | Evans |
| 6,896,612 B1 | 5/2005 | Novotny et al. |
| 6,924,981 B2 | 8/2005 | Chu et al. |
| 6,940,716 B1 | 9/2005 | Korinsky et al. |
| 7,039,924 B2 | 5/2006 | Goodman et al. |
| 7,106,538 B2 | 9/2006 | Minemura et al. |
| 7,277,247 B2 | 10/2007 | Hoshino |
| 7,434,412 B1 | 10/2008 | Miyahira |
| 7,474,497 B2 | 1/2009 | Jesionowski et al. |
| 7,635,246 B2 | 12/2009 | Neeper et al. |
| 7,656,602 B2 | 2/2010 | Iben et al. |
| 7,656,660 B2 | 2/2010 | Hoeft et al. |
| 7,746,634 B2 | 6/2010 | Hom et al. |
| 7,751,188 B1 | 7/2010 | French et al. |
| 7,961,419 B2 | 6/2011 | Suzuki et al. |
| 8,051,671 B2 | 11/2011 | Vinson et al. |
| 8,141,621 B2 | 3/2012 | Campbell et al. |
| 8,151,046 B2 | 4/2012 | Suzuki et al. |
| 8,154,870 B1 | 4/2012 | Czamara et al. |
| 8,206,976 B2 | 6/2012 | Kobayashi et al. |
| 8,209,993 B2 | 7/2012 | Carlson et al. |
| 8,210,914 B2 | 7/2012 | McMahan et al. |
| 8,456,840 B1 | 6/2013 | Clidaras et al. |
| 8,514,513 B2 | 8/2013 | Hori |
| 8,544,289 B2 | 10/2013 | Johnson et al. |
| 8,675,303 B2 | 3/2014 | Compton et al. |
| 8,694,152 B2 | 4/2014 | Cyrulik et al. |
| 8,789,384 B2 | 7/2014 | Eckberg et al. |
| 8,849,784 B2 | 9/2014 | Alber et al. |
| 8,857,208 B2 | 10/2014 | Malin |
| 8,939,524 B2 | 1/2015 | Gasser |
| 8,974,274 B2 | 3/2015 | Carlson |
| 9,025,275 B1 | 5/2015 | Manes et al. |
| 9,043,035 B2 | 5/2015 | Chainer et al. |
| 9,069,534 B2 | 6/2015 | Rogers |
| 9,110,641 B2 | 8/2015 | Wu |
| 9,155,230 B2 | 10/2015 | Eriksen et al. |
| 9,190,112 B1 | 11/2015 | Bayang et al. |
| 9,240,209 B1 | 1/2016 | Crawford et al. |
| 9,255,936 B2 | 2/2016 | Hunt et al. |
| 9,291,408 B2 | 3/2016 | Iyengar et al. |
| 9,321,136 B2 | 4/2016 | Eckberg et al. |
| 9,361,921 B2 | 6/2016 | Herget |
| 9,368,148 B2 | 6/2016 | Starr et al. |
| 9,433,122 B2 | 8/2016 | Ohba et al. |
| 9,642,286 B1 | 5/2017 | Gutierrez et al. |
| 9,888,615 B1 | 2/2018 | Frink et al. |
| 9,916,869 B1 | 3/2018 | Gavillan et al. |
| 9,916,871 B1 | 3/2018 | Gavillan et al. |
| 9,940,976 B1 | 4/2018 | Gale et al. |
| 9,949,410 B1 | 4/2018 | Kowalski et al. |
| 10,004,165 B1 | 6/2018 | Bailey et al. |
| 10,026,445 B1 | 7/2018 | Gale et al. |
| 10,026,455 B1 | 7/2018 | Gavillan et al. |
| 10,045,457 B1 | 8/2018 | Gavillan et al. |
| 10,276,214 B2 | 4/2019 | Gavillan et al. |
| 10,303,376 B2 | 5/2019 | Gavillan et al. |
| 10,395,695 B2 | 8/2019 | Gavillan et al. |
| 10,417,851 B2 | 9/2019 | Gale et al. |
| 10,418,063 B2 | 9/2019 | Gale et al. |
| 10,418,071 B2 | 9/2019 | Gale et al. |
| 10,431,254 B2 | 10/2019 | Gavillan et al. |
| 10,490,004 B2 | 11/2019 | Gale et al. |
| 10,679,666 B2 | 6/2020 | Gale et al. |
| 2002/0023444 A1 | 2/2002 | Felder et al. |
| 2002/0098064 A1 | 7/2002 | Ostwald et al. |
| 2003/0039056 A1 | 2/2003 | Satoh |
| 2003/0197619 A1 | 10/2003 | Lawrence et al. |
| 2004/0025515 A1 | 2/2004 | Evans |
| 2004/0080244 A1 | 4/2004 | Lowther, Jr. et al. |
| 2004/0145468 A1 | 7/2004 | La et al. |
| 2004/0153386 A1 | 8/2004 | Eckerdt |
| 2004/0165358 A1 | 8/2004 | Regimbal et al. |
| 2004/0264042 A1 | 12/2004 | Pollard et al. |
| 2005/0057847 A1 | 3/2005 | Armagost et al. |
| 2005/0170770 A1 | 8/2005 | Johnson et al. |
| 2005/0185323 A1 | 8/2005 | Brace et al. |
| 2005/0270727 A1 | 12/2005 | Shih |
| 2006/0177922 A1 | 8/2006 | Shamah et al. |
| 2006/0250578 A1 | 11/2006 | Pohl et al. |
| 2006/0259195 A1 | 11/2006 | Eliuk et al. |
| 2006/0262447 A1 | 11/2006 | Hoshino |
| 2007/0180278 A1 | 8/2007 | Botchek |
| 2007/0250410 A1 | 10/2007 | Brignone et al. |
| 2008/0043371 A1 | 2/2008 | Konshak |
| 2008/0061138 A1 | 3/2008 | Fisher et al. |
| 2008/0065903 A1 | 3/2008 | Goodman et al. |
| 2008/0094797 A1 | 4/2008 | Coglitore et al. |
| 2008/0106368 A1 | 5/2008 | Vitier |
| 2008/0151491 A1 | 6/2008 | Baldwin et al. |
| 2008/0231152 A1 | 9/2008 | Malin |
| 2009/0046427 A1 | 2/2009 | Noteboom et al. |
| 2009/0061758 A1 | 3/2009 | Yeung et al. |
| 2009/0168345 A1 | 7/2009 | Martini |
| 2009/0266511 A1 | 10/2009 | Yang |
| 2010/0078492 A1 | 4/2010 | Cislo |
| 2010/0170277 A1 | 7/2010 | Schmitt |
| 2010/0188810 A1 | 7/2010 | Andersen et al. |
| 2010/0249987 A1 | 9/2010 | Hong et al. |
| 2010/0254241 A1 | 10/2010 | Aoki |
| 2010/0311317 A1 | 12/2010 | McReynolds et al. |
| 2011/0022771 A1 | 1/2011 | Foerster |
| 2011/0083824 A1 | 4/2011 | Rogers |
| 2011/0108207 A1 | 5/2011 | Mainers et al. |
| 2011/0231007 A1 | 9/2011 | Biehle et al. |
| 2012/0046792 A1 | 2/2012 | Secor |
| 2012/0155027 A1 | 6/2012 | Broome et al. |
| 2012/0305042 A1 | 12/2012 | Lorbiecki |
| 2013/0031928 A1 | 2/2013 | Kim |
| 2013/0088833 A1 | 4/2013 | Cox et al. |
| 2013/0128455 A1 | 5/2013 | Koblenz et al. |
| 2013/0244563 A1 | 9/2013 | Noteboom et al. |
| 2014/0019768 A1 | 1/2014 | Pineau et al. |
| 2014/0059946 A1 | 3/2014 | Gardner et al. |
| 2014/0206271 A1 | 7/2014 | Iganacio |
| 2014/0238639 A1 | 8/2014 | Ambriz et al. |
| 2014/0277765 A1 | 9/2014 | Karimi et al. |
| 2014/0290162 A1 | 10/2014 | Tanimoto |
| 2014/0293471 A1 | 10/2014 | Sakuma |
| 2015/0036293 A1 | 2/2015 | Martini |
| 2015/0086305 A1 | 3/2015 | Ostwald et al. |
| 2015/0088319 A1 | 3/2015 | Dasari et al. |
| 2015/0106654 A1 | 4/2015 | Foster et al. |
| 2015/0167996 A1 | 6/2015 | Fadell et al. |

(56) References Cited

U.S. PATENT DOCUMENTS

| | | |
|---|---|---|
| 2015/0179210 A1 | 6/2015 | Ostwald et al. |
| 2015/0203297 A1 | 7/2015 | Manning et al. |
| 2015/0208554 A1 | 7/2015 | Leigh et al. |
| 2015/0269641 A1 | 9/2015 | Roy |
| 2015/0294525 A1 | 10/2015 | Broom et al. |
| 2016/0022104 A1 | 1/2016 | Templeton |
| 2016/0094898 A1 | 3/2016 | Primm et al. |
| 2016/0107312 A1 | 4/2016 | Morrill et al. |
| 2016/0109389 A1 | 4/2016 | Suzuki et al. |
| 2016/0112245 A1 | 4/2016 | Mankovskii |
| 2016/0117126 A1 | 4/2016 | DeSpiegeleer et al. |
| 2016/0223455 A1 | 8/2016 | Minegishi |
| 2016/0240061 A1 | 8/2016 | Li et al. |
| 2016/0302332 A1 | 10/2016 | Anderson et al. |
| 2017/0010015 A1 | 1/2017 | Jan |
| 2017/0064876 A1 | 3/2017 | Leckelt et al. |
| 2017/0154483 A1 | 6/2017 | Cordiner et al. |
| 2017/0275012 A1 | 9/2017 | Tretow et al. |
| 2017/0323666 A1 | 11/2017 | Jesionowski et al. |
| 2017/0347496 A1 | 11/2017 | Smith |
| 2018/0077819 A1 | 3/2018 | Roy |
| 2018/0155975 A1 | 6/2018 | Kempfle |
| 2018/0172304 A1 | 6/2018 | Wolfson |
| 2018/0184548 A1 | 6/2018 | Frink et al. |
| 2018/0267581 A1 | 9/2018 | Gavillan et al. |
| 2018/0267717 A1* | 9/2018 | Miranda Gavillan . G11B 15/68 |
| 2018/0267718 A1 | 9/2018 | Gale et al. |
| 2018/0268860 A1 | 9/2018 | Gavillan et al. |
| 2018/0268861 A1 | 9/2018 | Gavillan |
| 2018/0268873 A1 | 9/2018 | Gavillan |

FOREIGN PATENT DOCUMENTS

| | | |
|---|---|---|
| CN | 102881313 A | 1/2013 |
| CN | 204361533 U | 5/2015 |
| JP | 11-287499 A | 10/1999 |
| JP | 2001-93121 A | 4/2001 |
| JP | 2001-307474 A | 11/2001 |
| JP | 2009-87518 A | 4/2009 |
| JP | 2011-191207 A | 9/2011 |
| WO | 2007/099542 A2 | 9/2007 |
| WO | 2008/14578 A1 | 2/2008 |
| WO | 2009/134610 A2 | 11/2009 |
| WO | 2010/067443 A1 | 6/2010 |

OTHER PUBLICATIONS

Hanaoka Y. et al., "Technologies for Realizing New Eternus LT270 High-End Tape Library System", Fujitsu Sci. Tech. J. 42(1):24-31 (Jan. 2006).

Lee S. et al., "Thermoelectric-Based Sustainable Self-Cooling for Fine-Grained Processor Hot Spots", 15th IEEE Therm Conference pp. 847-856 (May 31-Jun. 3, 2016).

McCormick-Goodhart M.H. et al., "The Design and Operation of a Passive Humidity-Controlled Cold Storage Vault Using Conventional Freezer Technology and Moisture-Sealed Cabinets", IS&T's 2004 Archiving Conference, San Antonio, Texas (Apr. 20-23, 2005).

Oga S. et al., Indirect External Air Cooling Type Energy-Saving Hybrid Air Conditioner for Data Centers, "F-Cool NEO", Fuji Electric Review 60(1):59-64 (Mar. 30, 2014).

Ouchi M. et al., "Thermal Management Systems for Data Centers With Liquid Cooling Technique of CPU",13th IEEE Itherm Intersociety Conference pp. 790-798 (May 30-Jun. 1, 2012).

Rasmussen N., "Cooling Options for Rack Equipment With Side-to-Side Airflow", www.apc.com (2004).

Disclosed Anonymously, ip.com, "Method for a Direct Air Free Cooling With a Real Time Hygrometry Regulation for Data Center", IPCOM000200312D, pp. 1-3 (Oct. 5, 2010).

Authors: IBM, "Energy Efficient Cooling System for Data Center", IPCOM000182040D, pp. 1-4 (Apr. 23, 2009).

List of IBM Patents or Patent Applications Treated as Related dated Sep. 20, 2022, 3 pages.

Office Action dated Feb. 14, 2020 received in U.S. Appl. No. 15/460,429, 8 pages total.

Office Action dated Aug. 5, 2020 received in U.S. Appl. No. 16/557,099, 47 pages.

Office Action dated Jan. 29, 2021 received in U.S. Appl. No. 16/557,099.

Office Action dated Jul. 6, 2021 received in U.S. Appl. No. 16/597,469.

Office Action dated Jul. 16, 2021 received in U.S. Appl. No. 16/715,516.

Office Action dated Jan. 12, 2022 received in U.S. Appl. No. 16/715,516.

* cited by examiner

DATA STORAGE LIBRARY WITH SERVICE MODE FOR PROTECTING DATA STORAGE DRIVES

BACKGROUND

The present disclosure relates to a data storage library for the storage and transfer of data, and more specifically, to a data storage library capable of entering a distinct service mode when one or more components within the data storage library are in need of service, replacement, or both.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In "deep slot" libraries, two or more cartridges may be stored in a multi-cartridge deep slot cell, arrayed in series, one behind the other, in tiers ranging from a front-most tier to a rearmost tier.

SUMMARY

In accordance with an aspect of the disclosure, a data storage library system is disclosed, the system including a data storage library, at least one environmental conditioning unit fluidly coupled to the data storage library, at least one data storage drive retained within the data storage library, and at least one access door for providing access to an interior portion of the data storage library. The system also includes a library controller, wherein the library controller is configured to initiate a service mode prior to and during a service procedure performed within the data storage library, and further wherein at least one operational state within the at least one data storage drive is changed during the service mode.

According to another aspect of the disclosure, a system is disclosed, the system including a data storage library, at least one environmental conditioning unit associated with the data storage library and configured to control one or more interior environmental conditions within the data storage library, at least one data storage drive disposed within the data storage library, and at least one access door for providing access to an interior portion of the data storage library. The system also includes a library controller, wherein the library controller is configured to initiate a service mode prior to and during a service procedure performed within the data storage library, and further wherein the library controller is configured to ramp at least one interior environmental condition within the at least one data storage drive toward at least one exterior environmental condition outside of the data storage library during the service mode.

In accordance with another aspect of the disclosure, a method of servicing a data storage library is disclosed, the method including providing a data storage library, initiating a service mode prior to and during a service procedure being performed within the data storage library, and adjusting an interior temperature within at least one data storage drive retained in the data storage library toward an exterior temperature outside of the data storage library. The method also includes determining if the interior temperature within the at least one data storage drive is within a desired range of the exterior temperature outside of the data storage library, and allowing access into the data storage library if the interior temperature within the at least one data storage drive is within the desired range.

DETAILED DESCRIPTION

The following description is made for the purpose of illustrating the general principles of the present disclosure and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Efforts to improve the performance of traditional data centers attempt to minimize the cost of processing and storing data. One option that is employed to reduce operational costs of datacenters is to run the equipment in the datacenter at the high end of its environmental operational limits, thereby allowing for cooling of the datacenter to be reduced. In other words, datacenters are running increasingly hot and more humid conditions than traditional datacenters in an attempt to reduce operating costs. Although this strategy may be effective when applied to disk and/or flash data storage environments, magnetic tape is more susceptible to degradation when exposed to these unfavorable conditions. Therefore, this option is not available for magnetic data storage libraries.

In an effort to control the environment within magnetic data storage libraries so as to provide suitable working conditions for magnetic tape media, data storage drives, etc., air conditioning units may be incorporated into the data storage libraries themselves. While these air conditioning units effectively control the temperature and humidity within the data storage libraries, the environmental conditions of the area surrounding the data storage libraries remain largely unchanged, with conditions often being higher in both temperature and humidity. While this may allow a datacenter to operate at reduced costs, it may also result in a marked temperature differential between the interior and exterior environments of the data storage libraries. Such a temperature differential may prove problematic during service of the data storage library and/or replacement of data storage library components such as data storage cartridges, data storage drives, etc., as condensation may develop on replacement cartridges and other service parts during their service, installation, and/or removal from the data storage library. Condensation accumulation on such sensitive componentry may cause component damage, up to and including component failure and/or data loss.

Figure 1A:
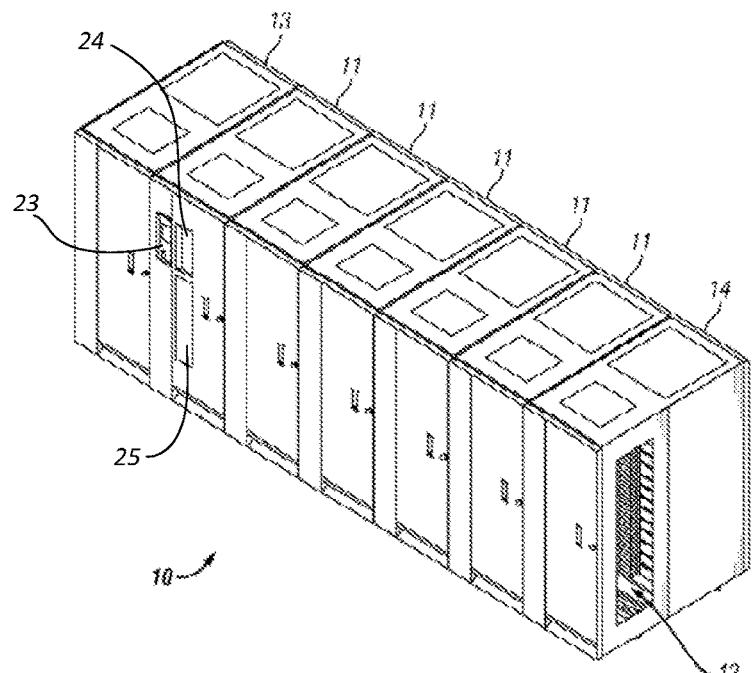
FIG. 1A is a perspective view of one embodiment of an automated data storage library.
Figure 1B:
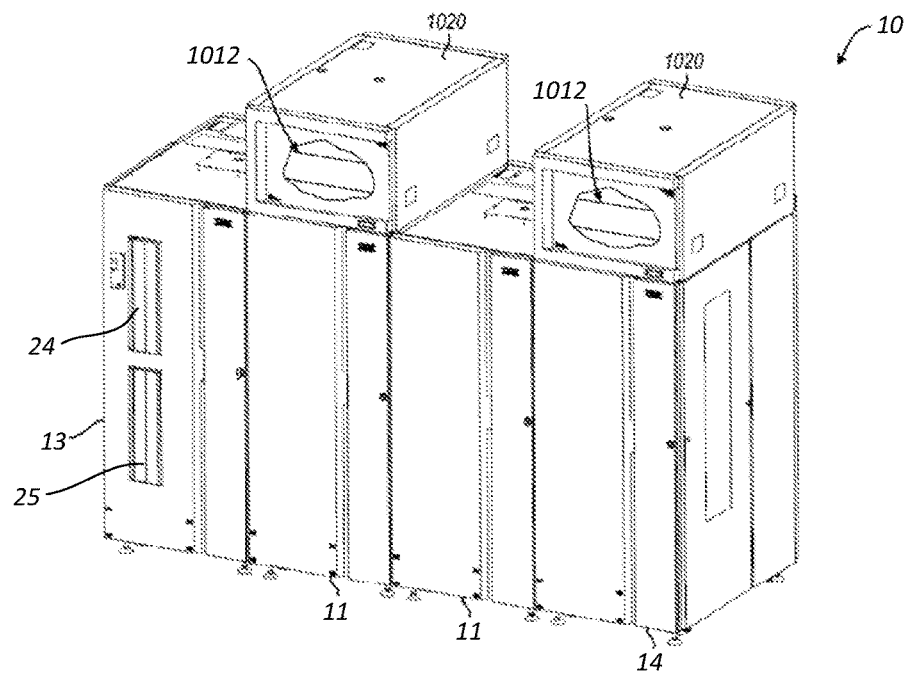
FIG. 1B is a perspective view of another embodiment of an automated data storage library
Figure 2:
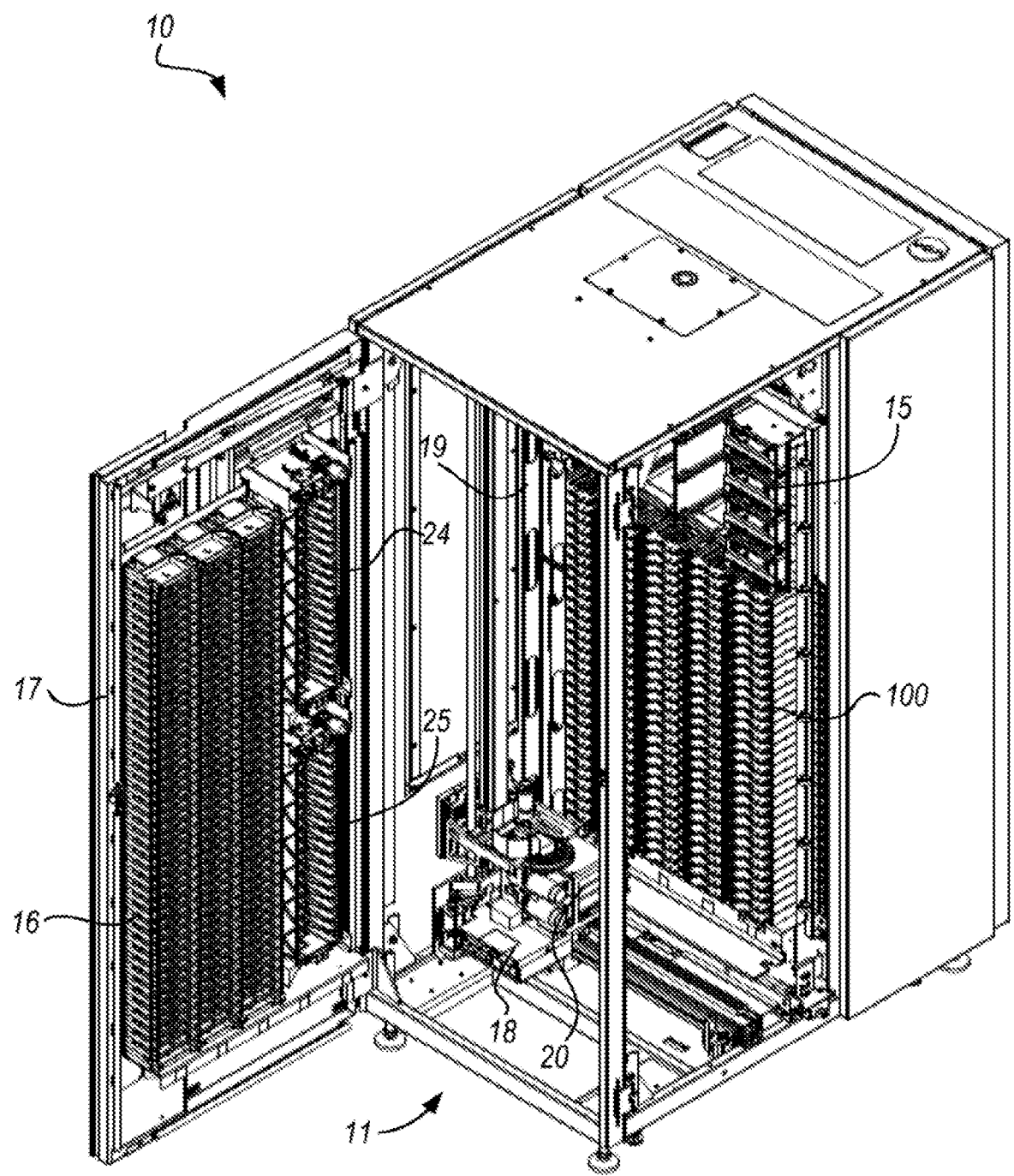
FIG. 2 is a perspective view of a storage frame from the data storage library of FIG. 1.

FIGS. 1A & 1B and FIG. 2 illustrate an example of a data storage system, e.g., an automated data storage library 10 which stores and retrieves data storage cartridges, containing data storage media (not shown), from multi-cartridge deep slot storage cells 100 and single cartridge storage slots 16. Examples of an automated data storage library which has a similar configuration as that depicted in FIG. 1A and FIG. 2, and may be implemented with some of the various approaches herein may include the IBM TS4500 Tape Library or the IBM TS3500 Tape Library.

The library 10 in the embodiment of FIG. 1A comprises a left hand service bay 13, one or more storage frames 11, and right hand service bay 14. The library 10 of FIG. 1B comprises a left handed service bay 13, one or more storage frames 11, a right handed service bay 14 and optional environmental conditioning units 1012 which may control the temperature, humidity and/or other environmental conditions in the interior of the library 10. While two environmental conditioning units are shown in FIG. 1B, it will be appreciated that more or less environmental conditioning units 1012 may be associated with the library, and in circumstances the library may have no environmental conditioning units. As will be discussed in further detail below, a frame may comprise an expansion component of the library. Thus, storage frames may be added or removed to expand or reduce the size and/or functionality of the library. According to different approaches, frames may include additional storage slots, deep storage slot cells, drives, import/export stations, accessors, operator panels, controller cards, communication cards, etc. Moreover, an accessor aisle 12 preferably extends between the storage frames and bays of the embodiments in FIGS. 1A & 1B thereby allowing an accessor to move between frames. Herein, a library frame may refer to an expansion frame or expansion module of an expandable library, or it may refer to part or all of a nonexpandable library.

FIG. 2 shows an exemplary embodiment of a storage frame 11, which may act as the base frame and/or the minimum configuration of the library 10. The storage frame 11 illustrated in FIG. 2 may have only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front door 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. The arrangement and positioning of the storage slots 16 and the deep slot cells 100 may be different than illustrated in FIG. 2.

With continued reference to FIG. 2, the storage frame 11 of the library 10 also includes at least one data storage drive 15, e.g., for reading and/or writing data with respect to the data storage media in the data storage cartridges. Additionally, a first accessor 18 may be used to transport data storage cartridges containing data storage media between the plurality of storage slots 16, the multi-cartridge deep slot cells 100, and/or the data storage drive(s) 15. According to various approaches, the data storage drives 15 may be optical disk drives, magnetic tape drives, or other types of data storage drives that are used to read and/or write data with respect to the data storage media.

As illustrated, the storage frame 11 may optionally include an operator panel or other user interface, such as a web-based interface, which allows a user to interact with the library 10. Optionally, the library 10 may have an associated software application having a user interface, which also allows a user to interact with the library 10. The software application may be executable on a computing device, a remote server, a cloud or a mobile device.

Figure 3:
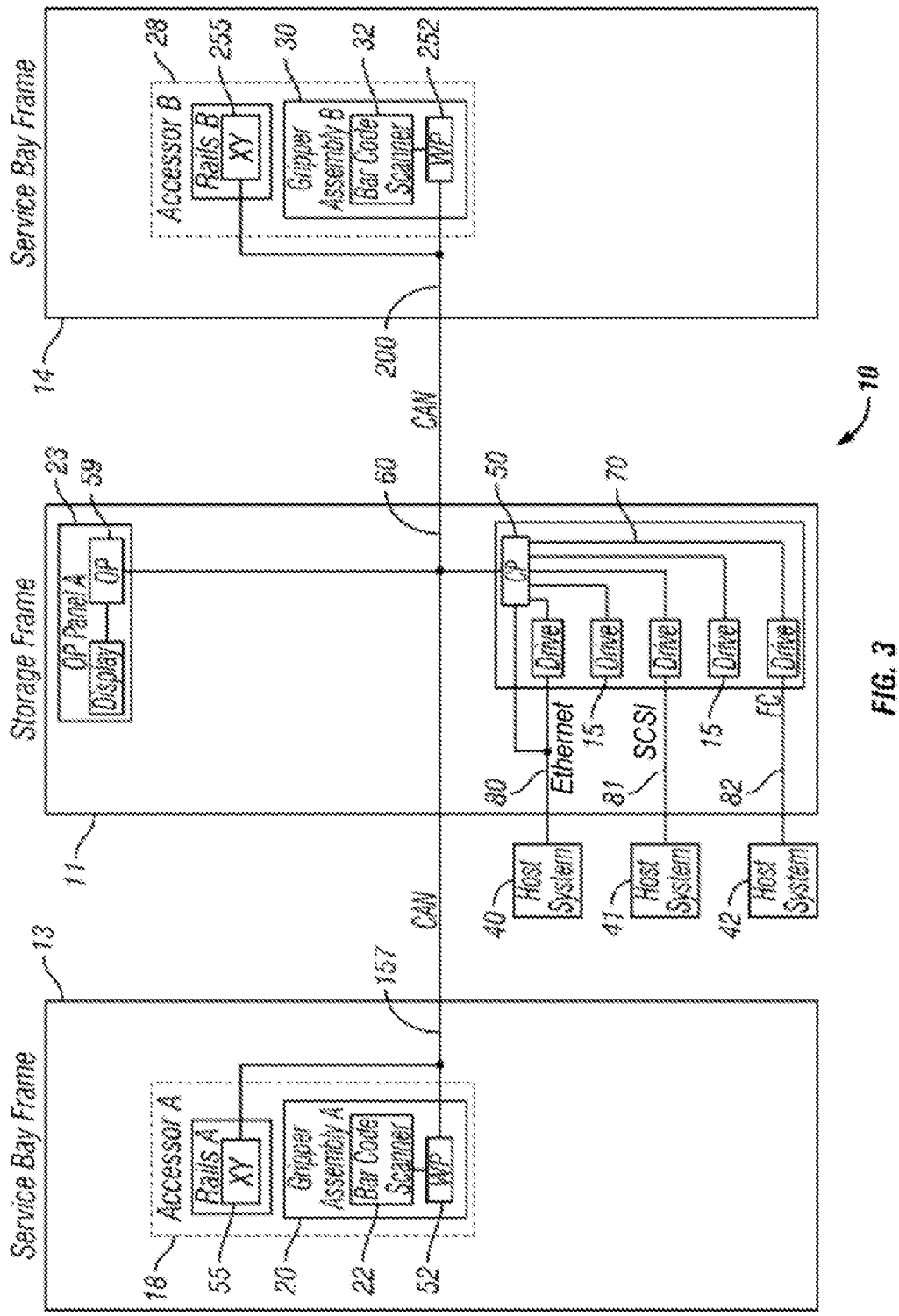
FIG. 3 is a schematic diagram of one embodiment of an automated data storage library.

Referring now to FIG. 3, the automated data storage library 10 as described in reference to FIGS. 1A & 1B and FIG. 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements of the accessor, gripper, controllers, and other components, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16, the deep slot cells 100, and the data storage drives 15. The commands are typically logical commands identifying the data storage cartridges or data storage cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

As illustrated in FIG. 3, the communication processor node 50 is coupled to each of the data storage drives 15 of a storage frame 11, via lines 70, and may communicate with the drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, storage cells 100, data storage drives 15, networks 60, etc.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
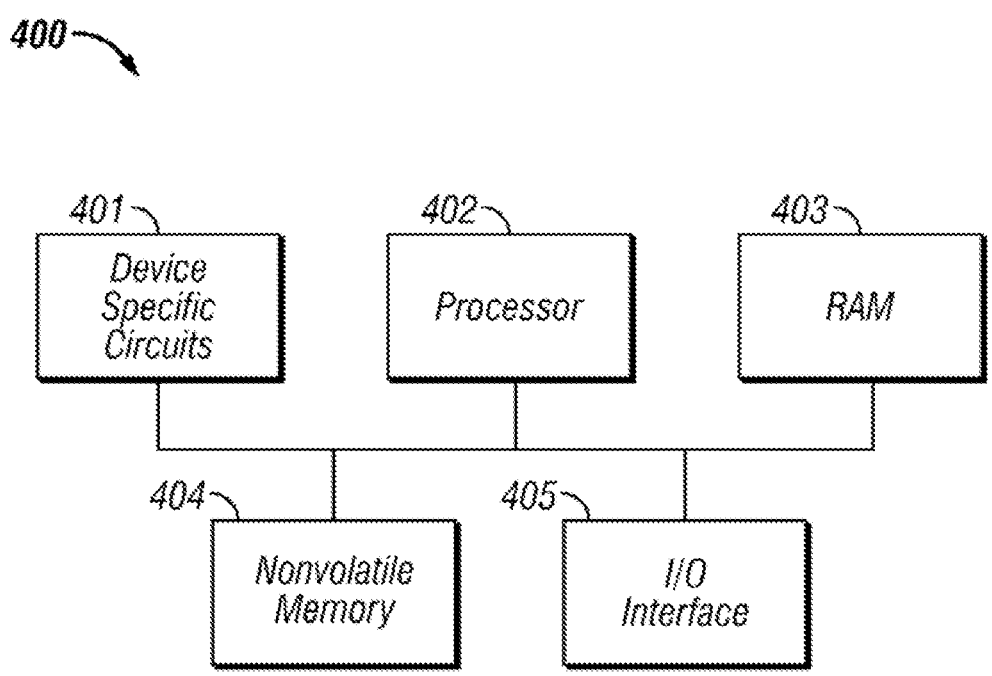
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data containing programming instructions that can be executed to cause the processor 402 to perform certain functions.

In some embodiments, the I/O interface 405 may include a communication interface that allows the processor 402 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The controller 400 may communicate with an external device via the communication interface 405 in any communication protocols such as Automation/Drive Interface (ADI).

The device specific circuits 401 provide additional hardware to enable the controller 400 to perform unique functions including, but not limited to, motor control of an accessor cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers, or multiple cores in a processor chip.

Figure 5A:
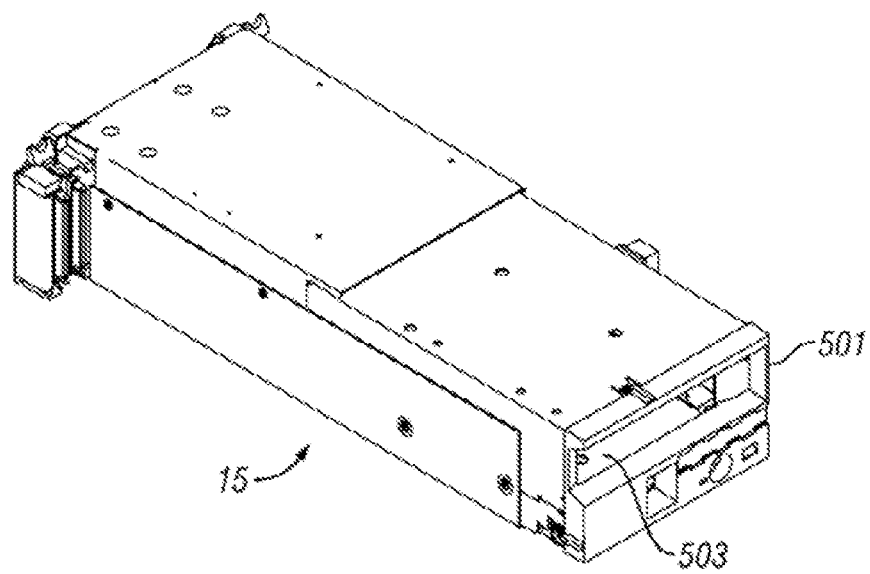
FIG. 5A is a front perspective view of a data storage drive according to one embodiment.
Figure 5B:
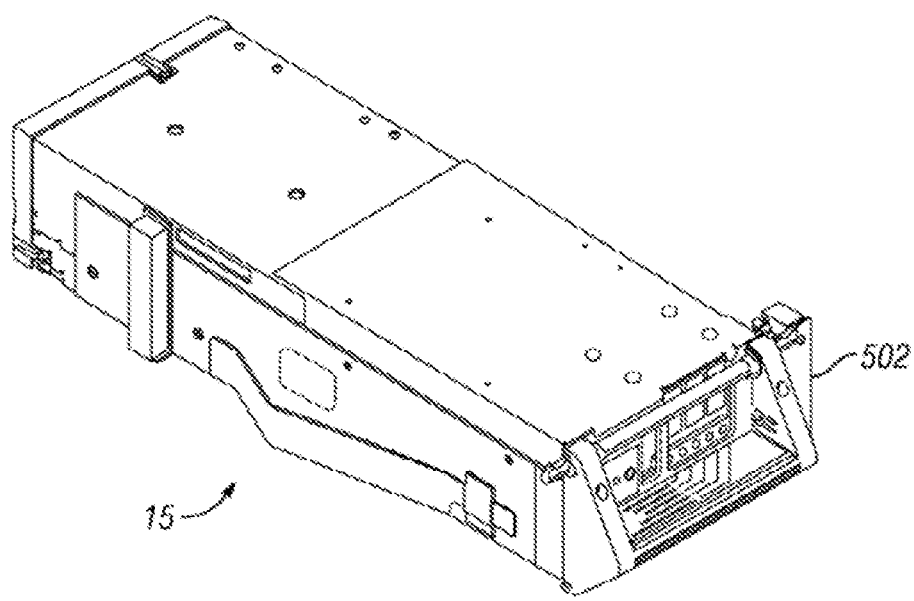
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the disclosure or the invention. In fact, any configuration of data storage drive may be used whether or not it includes a hot-swap canister. Herein, data storage drive may comprise a drive brick (e.g., a minimum configuration of a drive), a drive sled (e.g., a drive brick mounted on a plate or assembly), a drive canister (e.g., a drive brick mounted in an enclosure), or any other method of mounting and/or packaging a drive brick in an automated data storage library. As discussed above, a data storage drive 15 is used to read and/or write data with respect to the data storage media, and may additionally communicate with a memory which is separate from the media, and is located within the cartridge. Thus, according to one approach, a data storage cartridge having data storage media may be placed into the data storage drive 15 at opening 503.

Figure 6:
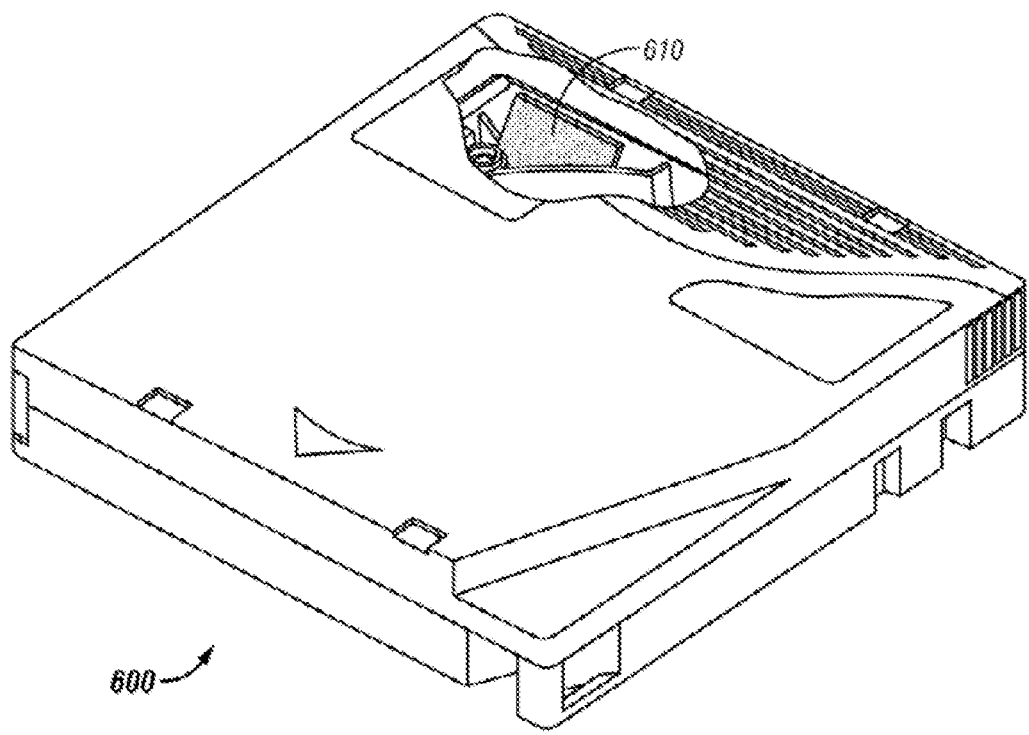
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of FIG. 6, which is in no way intended to limit the disclosure or the invention. In fact, any configuration of data storage cartridge may be used whether or not it comprises a cartridge memory. According to various approaches, the media of the data storage cartridge may include any type of media on which data may be stored, including but not limited to magnetic media, e.g., magnetic tape, disks, etc.; optical media, e.g., optical tape, disks, etc.; electronic media, e.g., PROM, EEPROM, flash PROM, COMPACTFLASH™, SMARTMEDIA™, MEMORY STICK™, etc., or other suitable media. Moreover, an example of a data storage cartridge that is widely employed in automated data storage libraries for mass data storage is a magnetic tape cartridge in which the media is magnetic tape.

Figure 7:
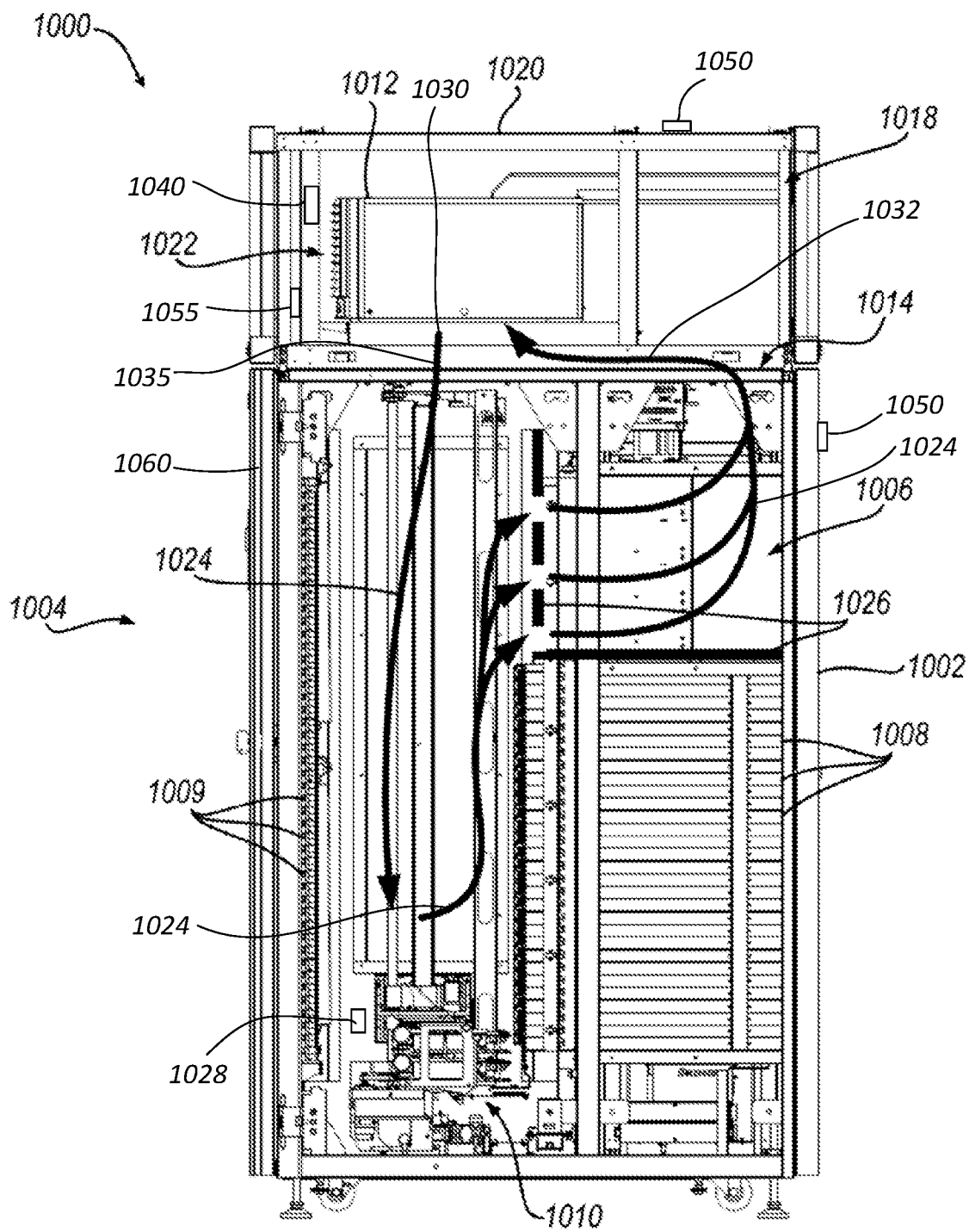
FIG. 7 is a partial side view of one embodiment of a system for storing magnetic recording media.

Referring now to FIG. 7, a system 1000 includes a frame 1002 of an automated data storage library 1004, similar to frames 11 described above with respect to FIGS. 1B and 2. As described above, automated libraries are typically used to store cartridges and drives in large arrays to store large amounts of data. Thus, an interior of frame 1002 is illustrated as a tape library in one embodiment, and is depicted as including one or more tape drives 1006, an area for storing tape cartridges (e.g., multi-cartridge deep slot cells 1008 and single cartridge storage slots 1009), and a robotic accessor 1010, among other components which would be apparent to one skilled in the art upon reading the present description (e.g., see FIG. 2 above). At least one access door 1060 may be provided, and access door 1060 may be provided with a locking mechanism for selectively restricted access to the interior of the frame 1002. The locking mechanism may be locked either automatically (e.g., via a command from a library controller), or manually by a technician or other personnel. Additionally, while not shown, system 1000 may further include one or more indicators capable of relaying operational status of the system 1000 to the user. For example, one or more visual indicators (e.g., lights, text indicators, etc.) may be externally visible to a technician or other personnel, with the visual indicator providing a status of the system 1000. Alternatively and/or additionally, the indicator may be one or more audible indicators.

System 1000 further includes an optional environmental conditioning unit 1012 associated with the frame 1002. The environmental conditioning unit 1012 may be integrated with and coupled to frame 1002. For the purposes of the present disclosure, it is to be understood that an environmental conditioning unit may be any device which conditions the air and/or the surrounding environment and is able to change the environmental conditions. The environmental conditions may include (but are not limited to) temperature, humidity, pressure, etc. In one embodiment, the environmental conditioning unit may be an air-conditioning unit. In other embodiments, the environmental conditioning unit may be a thermo-electric heater, a thermo-electric cooler, an electric heater, a liquid heater, a liquid cooler, a heat pump, an evaporative cooler, an ionizer, a de-ionizer, a humidifier, a dehumidifier, one or more fans, or any combination thereof. An environmental conditioning unit in accordance with one embodiment of the present disclosure may increase or decrease the temperature, humidity, pressure, etc. The environmental conditioning unit 1012 may be coupled to an upper surface 1014 (e.g., the roof) of the frame 1002 as shown in FIG. 1B and FIG. 7. The environmental conditioning unit 1012 preferably operates without negatively affecting the operating conditions in the frame 1002. Alternatively, an environmental conditioning unit may be functionally associated with the frame 1002 by positioning the environmental conditioning unit elsewhere and using ducts to route the air to the interior of the frame 1002, coupling the environmental conditioning unit to a side of the frame 1002, coupling the environmental conditioning unit to a bottom of the frame 1002 (underneath the frame 1002), etc., depending on the desired approach.

The environmental conditioning unit 1012 is preferably configured such that it may adjust, change and/or regulate the relative conditions (e.g., temperature, humidity, contaminant presence via filtering, etc.) inside the frame 1002. Thus, according to different approaches, the environmental conditioning unit may be able to reduce the temperature of the interior of the frame 1002 and/or reduce the relative humidity of the interior of the frame 1002, depending on the type of environmental conditioning unit 1012 employed. The environmental conditioning unit 1012 is preferably configured to turn on and off as desired to maintain a selected temperature and/or humidity in the interior of the frame 1002. Alternatively, the environmental conditioning unit may have a fan and the fan can be left always on to keep air circulating within the interior of the frame. In one embodiment, the environmental conditioning unit may be an air conditioning unit and the fan may be continuously on and the condenser may turn on and off to maintain a selected temperature and/or humidity in the interior of the frame 1002.

As would be appreciated by one skilled in the art, the environmental conditioning unit 1012 may be an air conditioning unit and may be able to adjust the relative temperature and/or humidity of the interior of the frame 1002 in a conventional manner. Cold air may flow into the interior of the frame 1002 via an inlet air duct 1030 which may connect the environmental conditioning unit 1012 to the interior of the frame 1002, and form an inlet 1035 in the upper surface 1014 of the frame 1002. Specifically, an inlet air duct 1030 may direct the air cooled by the environmental conditioning unit 1012 into the interior of the frame 1002, e.g., where the majority of the data storage media may be stored. As a result, air flow is created from the environmental conditioning unit 1012 to the interior of the frame 1002, as indicated by arrows 1024. This air flow may be induced by a fan included in the environmental conditioning unit 1012 and/or by using the fans in the one or more tape drives 1006 in the frame 1002. Although the air flow is preferably directed from the environmental conditioning unit 1012 to the interior of the frame 1002, and from the interior of the frame 1002 back to the environmental conditioning unit 1012, the particular path that the air flow is shown as extending along in the present embodiment by arrows 1024 is in no way intended to limit the disclosure or the invention.

With continued reference to FIG. 7, system 1000 may include an enclosure 1020 for the environmental conditioning unit 1012. An additional fan 1040 may be included in the enclosure 1020 for passing ambient air over external components of the environmental conditioning unit 1012 to further promote heating, cooling and/or conditioning of the air. Moreover, the enclosure 1020 may include an opening, a baffle or baffles, etc. to direct ambient air exterior to the library 1004 toward an inlet 1022 of the environmental conditioning unit 1012.

In one embodiment, any vents, voids, seams, etc. in the frame 1002 of the library 1004, other than inlet 1035 and an outlet 1032 in an upper surface 1014 of the frame 1002, are preferably sealed such that air from outside the frame 1002 is restricted from entering the interior thereof. The frame 1002 may be sealed using any processes which would be apparent to one skilled in the art upon reading the present description, e.g., including but not limited to inserting foam, implementing insulating seals, etc. New frames may be built without any vents, voids, seams, etc. The housing and panels enclosing the frame 1002 may also be insulated to prevent or inhibit unconditioned air from entering the frame 1002.

The frame 1002 may also include one or more environmental sensors 1050 exterior to the library 1004 and may also include one or more sensors 1055 exterior to the library 1004 but inside the enclosure 1020 for the environmental conditioning unit 1012. In one embodiment the sensors 1055 may be located in front of inlet 1022 of the environmental conditioning unit 1012. The environmental sensors 1050, 1055 may be any sensor appropriate for determining the environmental conditions at the sensor location, such as one or more temperature sensors, one or more humidity sensors, one or more pressure sensors, etc. The one or more environmental sensors 1050, 1055 may be in communication with a library controller, such as library controller 400 shown and described with respect to FIG. 4. The one or more signals provided by the environmental sensors 1050, 1055 may be utilized to control the output and operation of the environmental conditioning unit 1012. Although the embodiment illustrated in FIG. 7 includes a single frame 1002 and a single environmental conditioning unit 1012, other embodiments may include additional frames and/or environmental conditioning units.

System 1000 illustrated in FIG. 7 may further comprise one or more environmental sensors 1028 disposed within the interior of the library 1002. The environmental sensor(s) may be any appropriate sensor for determining the environmental conditions within the frame 1002, such as one or more temperature sensors, one or more humidity sensors, one or more pressure sensors, etc. The one or more environmental sensors 1028 may be in communication with a library controller, such as controller 400 shown and described with respect to FIG. 4. As such, the signal provided by the one or more environmental sensors 1028 may be utilized to control the output and operation of the environmental conditioning unit 1012.

Although the embodiment illustrated in FIG. 7 includes a single frame 1002 and a single environmental conditioning unit 1012, other embodiments may include additional frames and/or environmental conditioning units.

While a data storage library having an associated and/or integrated environmental conditioning unit advantageously controls the environmental conditions within the library, some challenges may exist when components within such a data storage library need to be serviced or replaced. As noted above, many data centers are maintained at higher temperatures and higher humidity levels to reduce the costs related to cooling the data center. For this reason, environmental conditions within the data center may differ substantially from those within a data storage library having an associated environmental conditioning unit. As a result, opening an access door to the data storage library may introduce an influx of air from the data center into the conditioned environment of the data storage library, potentially causing condensation formation and/or accumulation on various surfaces within the data storage library, and particularly on those surfaces having temperatures cooler than the external air. Condensation formation on surfaces of sensitive components such as data storage cartridges and data storage drives for reading data storage media is undesirable, as moisture may lead to adverse effects, and, in extreme situations, failure of the components and/or data loss. Specifically, the read/write tape head within the data storage drive(s) may be particularly sensitive to many forms of contamination, including condensation formation.

Thus, in accordance with aspects of the present disclosure, a data storage library capable of entering a distinct service mode is provided. The service mode may be initiated prior to exposing the interior of the library to environmental conditions of the data center (e.g., environmental conditions outside the library) and/or prior to allowing a technician or other personnel to enter into the interior of the library to service and/or replace one or more library components, or, alternatively, may be initiated any time an access door or other access panel on the data storage library is to be opened. Upon initiation of the service mode, the temperature of at least a portion of the one or more data storage drive(s) may be increased. In this way, the interior of the data storage library may be accessed through a door or other entry point, but with a reduced possibility for the formation of condensation on or within the sensitive componentry in the data storage library.

Figure 8:
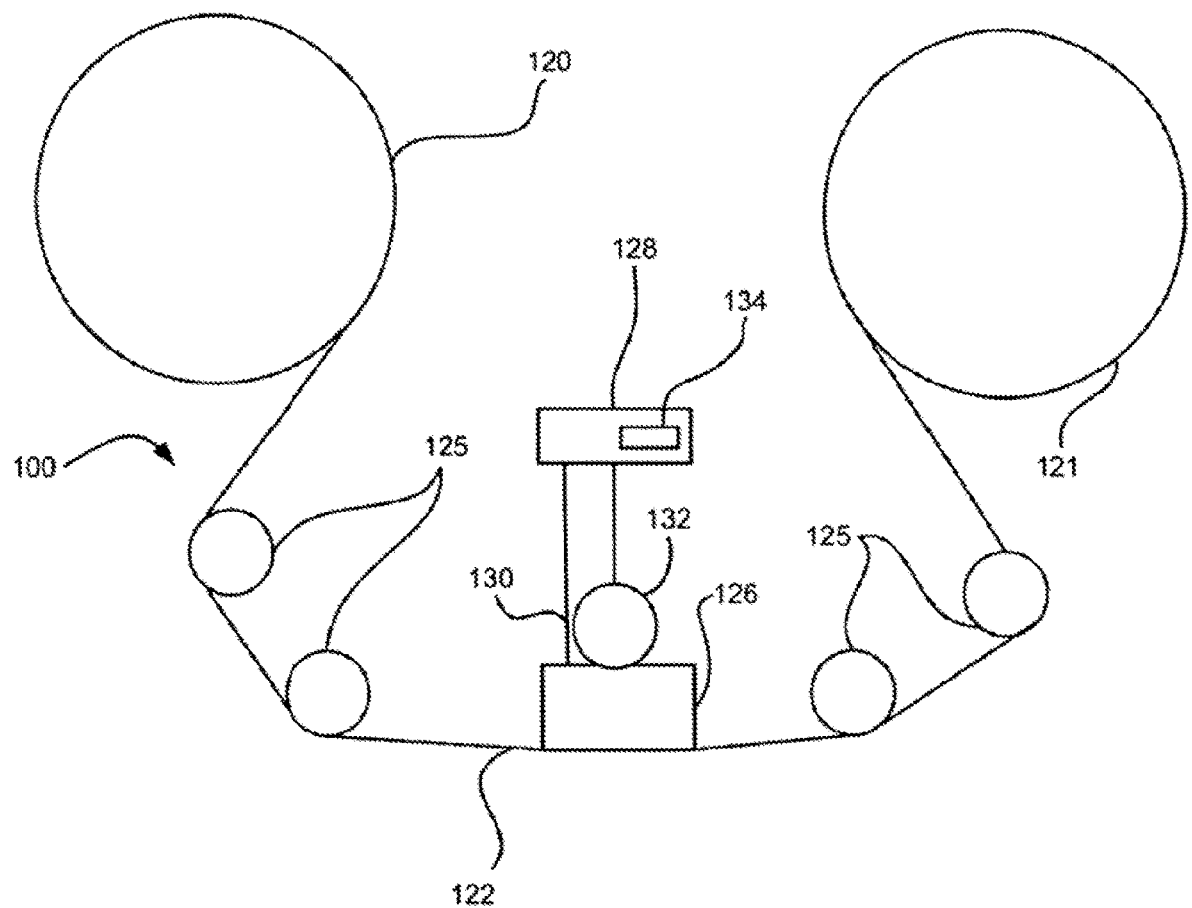
FIG. 8 is a schematic view of portions of a data storage drive according to one embodiment.

Referring to FIG. 8, a schematic illustration of various components of a data storage drive 100 is shown. It is to be understood that data storage drive 100 may be the same or similar to data storage drive 15 discussed above. Furthermore, while one specific implementation of a data storage drive is shown in FIG. 8, it is also to be understood that the embodiments described herein may be implemented in the context of any type of data storage drive system.

Data storage drive 100 may include therein a removable data storage cartridge, which may be configured similarly to data storage cartridge 600 disclosed above with respect to FIG. 6. A take-up reel 121 may be provided to support a length of tape 122 that is supplied by the supply reel 120. The data storage drive 100 may further include one or more drive motors (not shown) to drive the supply reel 120 and the take-up reel 121 so as to move the tape 122 over a tape head 126, wherein the tape head 126 may contain various read/write sensors. The sensors of tape head 126 may be any appropriate sensors, such as one or more giant magnetoresistance (GMR) sensor(s) and/or tunnel magnetoresistance (TMR) sensor(s).

Guides 125 may be configured to guide the tape 122 across the tape head 126. In turn, the tape head 126 may be coupled to a controller assembly 128 via one or more cables 130. The controller 128 may control tape head functions such as servo following, writing, reading, etc. The cable(s) 130 may include read/write circuits to transmit data to the head 126 to be recorded on the tape 122 and to receive data read by the head 126 from the tape 122. An actuator 132 may control the position of the head 126 relative to the tape 122.

As noted above, it may be advantageous for the library to enter a service mode when technician entry into the data storage library is needed for component service and/or replacement. The tape heads (such as tape head 126) of the data storage drives may be particularly sensitive to an influx of external air into the data storage library, as the various read/write sensors of the tape heads may not suitably perform the read and/or write operations if condensation is able to form thereon. Thus, in accordance with an aspect of the disclosure, the data storage library may be configured to enter a special service mode prior to any door or access panel of the data storage library being opened/accessed for service. During the service mode, a command (or message) may be sent to all data storage drives (such as data storage drive 100) to maintain and/or enable power to at least the read elements of the tape head(s) 126, including those tape heads 126 that are not actively performing any read/write operations on data storage cartridges at the time the service mode is implemented. The command may be sent to all data storage drives 100 from, for example, a library controller, such controller 400 shown and described with respect to FIG. 4. The service mode may be entered automatically any time a door or other access panel is to be opened, or it may be manually entered by a technician or other person via, for example, a user interface on the data storage library.

In changing an operational state of the data storage drive(s) 100 by providing or maintaining power to at least the read elements of tape head(s) 126 during the service mode, the tape head(s) 126 may be maintained at a higher temperature than the surrounding conditioned environment within the interior of the data storage library. In this way, the formation and/or accumulation of condensation on the tape head(s) 126 may be resisted, impeded, inhibited and/or prevented during a service procedure in which an influx of external air may enter the data storage library, as the temperature of the tape head(s) 126 may be sufficiently elevated so as not to be effected by an intrusion of warm, humid external air. The power level applied to the read elements of the tape head(s) 126 may be predetermined based on known operational limits, interior and external environmental conditions of the data storage library, etc.

In accordance with aspects of the disclosure, the power supplied to at least the read elements of the tape head(s) 126 may be provided at a level sufficient to maintain an adequately high local temperature at and/or around tape head(s) 126 so as to inhibit and/or avoid the formation of condensation thereon. The local temperature on tape head(s) 126 may be maintained at a level considered reliable for a time period beyond that of any typical service procedure, yet higher than a local temperature considered reliable for long-term continuous use. For example, if the tape head(s) 126 utilizes one or more GMR sensors, the maximum Joule heating temperature may be 212° F. (100° C.) during actual use of the data storage drive(s) 100. However, without an actual reading/writing operation of the tape being performed, the GMR sensors may be heated to absolute temperatures of between, e.g., 302° F. to 392° F. (150° C. to 200° C.) for a period of up to several months. Thus, the tape head(s) 126 may be held at such elevated temperatures during a short-term service mode without concern for the tape head sensor(s) being compromised. Similarly, if the tape head(s) 126 utilize one or more TMR sensors, a maximum voltage for continuous use over many years may be 200 mV, but an intermittent maximum voltage of 250 mV may be applied for a period of days, or perhaps even weeks. Thus, during occasional service procedures (and accompanying service modes), an elevated voltage may be applied to the TMR sensors in order to avoid and/or prevent condensation formation thereon, as the local temperature on and/or around the tape head(s) 126 will increase with increasing voltage application. It is to be understood that the maximum temperature and/or voltage levels disclosed above are merely examples, and that actual heating condition limitations for particular read sensors of tape head(s) 126 may vary dependent upon the specific geometry of the sensor(s) and sensor material(s) utilized.

Upon completion of the service procedure, the service mode may be exited either automatically (e.g., upon sensing closure of a door or access panel on the data storage library) or manually (e.g., via operator input to a user interface that the service mode is complete). The library controller may then send a command or message to the data storage drive(s) 100 to resume their pre-service mode conditions. Thus, for those data storage drive(s) 100 which were not actively being used in a read/write procedure, the power supplied to the tape head(s) 126 may be turned off and/or disconnected, while those data storage drive(s) 100 that were actively being used in a read/write procedure immediately prior to the service mode implementation may continue having power supplied to the tape head(s) 126. Herein, internal temperature of a data storage drive may refer to air temperature (e.g., the temperature of an air space within a drive) or component temperature (e.g., the temperature of a tape head, integrated circuit, card, housing, frame, surface, etc.).

Next, a special service mode in accordance with another aspect is disclosed. As discussed above with respect to FIGS. 5A-5B, 6, and 8, one or more data storage cartridges may be loaded into a data storage drive for data read/write operations. As FIG. 8 illustrates, tape 122 held within a data storage cartridge may be guided across the tape head 126 of a data storage drive 100 to complete data read/write operations. However, not only does tape 122 act as a physical medium for the storage of data, but tape 122 may also act as a physical barrier to protect the tape head 126 from outside contaminants, including condensation.

Thus, in accordance with an embodiment of the disclosure, the data storage library may be configured to enter a special service mode prior to any door or access panel of the data storage library being opened/accessed for service. During the service mode, a command (or message) may be sent to all data storage drives (such as data storage drive 100) having data storage cartridge(s) already mounted therein to retain the data storage cartridge(s) and to configure the cartridge such that the tape 122 remains in contact with tape head(s) 126. The data storage cartridge(s) in this embodiment are not unloaded during the service mode. The command may be sent to the data storage drives 100 via, for example, a library controller, such controller 400 shown and described with respect to FIG. 4.

Additionally, initiation of the service mode may also send a command to the library robotics (such as, e.g., accessor 18 shown in FIG. 2) to load at least one data storage cartridge into any empty, unused data storage drive 100 within the data storage library. The data storage cartridge(s) utilized in these empty data storage drive(s) 100 may preferably be protective and/or diagnostic cartridges, as opposed to active read/write (and potentially customer-owned) cartridges. The protective and/or diagnostic cartridge(s) would have a tape or medium that remains in contact with the tape head and preferably forms a barrier to protect the tape from environmental conditions and contaminants. These data storage cartridge(s) would remain in the previously-empty data storage drive(s) 100 until completion of the service mode. In this way, all data storage drives in the data storage library preferably would have at least one cartridge inserted therein, and thus all tape heads 126 would be covered/protected from contaminants and/or the formation of condensation thereon due to the physical barrier provided by the tape 122 itself.

Additionally, or alternatively, data storage cartridges may be unloaded and non-operational cartridges, i.e., cartridges that do not contain data (e.g., protective and/or diagnostic cartridges) may be loaded into the data storage drive. Additionally, or alternatively, the data storage library may contain protective and/or diagnostic cartridges whose primary purpose is to protect the tape heads during a service mode. For example, tape or a physical barrier that overlies the tape head may be thicker and be configured and arranged to provide improved protection against environmental conditions and/or contaminants than the data storage cartridges and/or protective and/or diagnostic cartridges. The data storage library may have a sufficient number of the protective and/or diagnostic cartridges for each data storage drive in the data storage library and upon initiation of the service mode, empty data storage drives may receive the protective and/or diagnostic cartridges, and data storage drives having data storage cartridges or other cartridges may be removed and replaced with protective and/or diagnostic cartridges.

The service mode may be entered automatically any time a door or other access panel is to be opened, or it may be manually entered by an operator via, for example, a user interface on the data storage library. Likewise, the service mode may be exited automatically via sensing that the door or other access panel has been closed, or it may be exited manually by an operator input that the service procedure is complete. Upon exiting the service mode, the diagnostic cartridges and/or protective and/or diagnostic cartridges that had been inserted into the empty data storage drives may be removed by, e.g., the robotic accessor(s) in the data storage library. Additionally, a command or message may be sent to all previously-active data storage drives that they may resume normal operations and/or allow for the unloading of the data storage cartridges housed therein.

In accordance with another aspect of the disclosure, not only may one or more data storage cartridges be loaded into (or remain within) each data storage drive during the service mode, but a low-velocity read/write operation may also be performed by each data storage drive during the service mode. Such low-velocity read/write operations may help to maintain the tape heads and surrounding componentry at a certain elevated temperature as compared to the temperature of an inactive data storage drive, which may further act to resist, impede, inhibit and/or prevent condensation formation and/or accumulation on the sensitive componentry within the data storage drive. The low-velocity read/write operation may cause less wear on the drive componentry than a typical read/write operation, and, as such, may be advantageous for a service mode application, where many of the data storage drives may contain only protective and/or diagnostic cartridges therein.

In accordance with yet another aspect of the disclosure, a special service mode may be implemented in which a command is sent to all data storage drives within the data storage library to eject any customer-supplied data storage cartridges prior to service. Then, only protective and/or diagnostic cartridges may be inserted (via, for example, a robotic accessor) into each data storage drive. Additionally, and/or alternatively, the low-velocity read/write operation may be performed on the protective and/or diagnostic cartridges as detailed above. In this way, the service mode may only utilize protective and/or diagnostic cartridges to provide protection to the tape heads and various other components within the data storage drive, thereby avoiding possible issues related to customer-supplied data storage cartridges being used during the service procedure.

Figure 9:
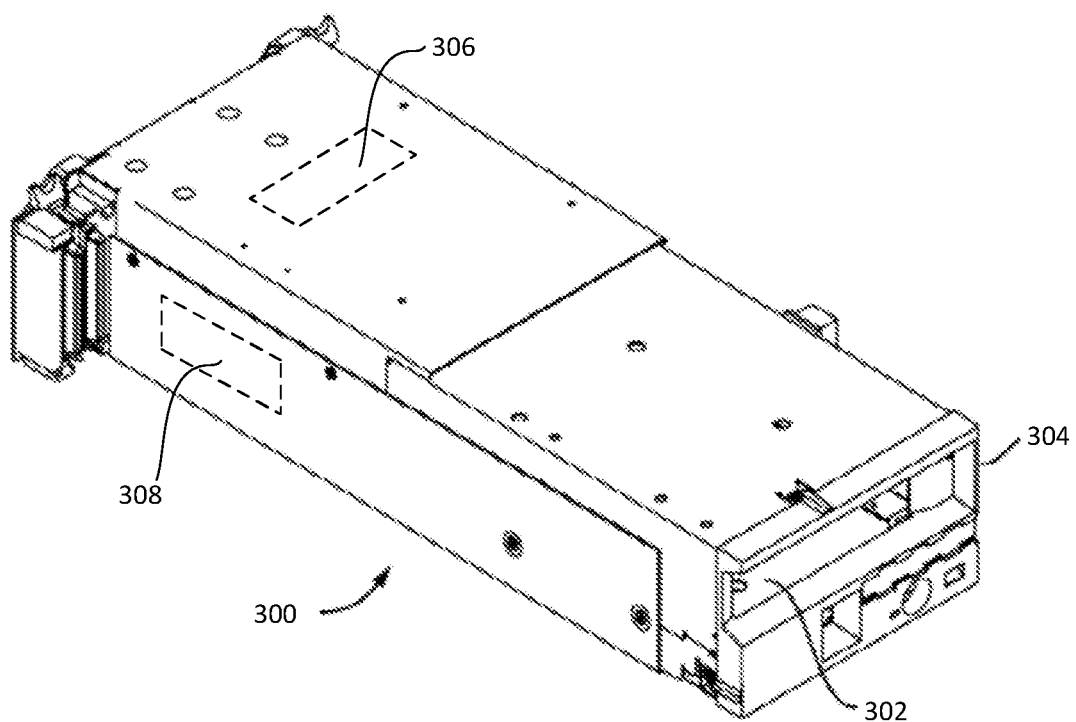
FIG. 9 is a front perspective view of a data storage drive according to one embodiment.

Next, referring to FIG. 9, a data storage drive 300 in accordance with another aspect of the disclosure is illustrated. Similar to data storage drive 15 described above with respect to FIGS. 5A-5B, data storage drive 300 may be utilized to read and/or write data with respect to the data storage media, and may additionally communicate with a memory which is separate from the media and located within the cartridge. Thus, according to one approach, a data storage cartridge having data storage media may be placed into the data storage drive 300 at opening 302 on a front side 304. While only one data storage drive 300 is illustrated in FIG. 9, it is to be understood that a data storage library may have multiple data storage drives 300 stored therein. Data storage drive 300 further comprises a heating mechanism 306 housed at least partially within the data storage drive 300. Heating mechanism 306 may be any appropriate device capable of producing heat, such as one or more resistors or any other heating element. Additionally, data storage drive 300 may have at least one environmental condition sensor 308 housed therein, wherein environmental condition sensor(s) 308 may be used to determine, for example, the temperature and/or humidity within the data storage drive 300.

As noted in various aspects of the disclosure described above, the data storage library may enter a special service mode, either automatically or manually, when service is needed within the data storage library. In accordance with the present aspect, however, the heating mechanism 306 within data storage drive 300 may be activated upon initiation of the service mode. In this way, the interior of the data storage drive(s) 300 may increase in temperature during the service mode which, in turn, may aid in resisting, impeding, inhibiting, and/or preventing the formation of condensation on components within the drive (such as the tape head) when a door or other access panel to the data storage library is opened for a service procedure. When the service mode is exited (again, either automatically or manually) and the door or other access panel to the data storage library has been closed, the heating mechanism 306 may be turned off, thereby reducing the temperature within the data storage drive 300 and allowing the data storage drive 300 to resume its normal operation.

Alternatively and/or additionally, in accordance with another aspect of the disclosure, the heating mechanism 306 may be activated any time a door or other access panel of the data storage library is opened. Still further, the heating mechanism 306 may be activated any time a data storage cartridge is removed from data storage drive 300 and may be deactivated any time a data storage cartridge is inserted or loaded into data storage drive 300. Thus, a distinct initiation of a service mode would not be needed. Instead, when it is detected that a door or other access panel is opened (via, e.g., door sensors in communication with the library controller, etc.), the heating mechanism 306 may be turned on in order to protect the drive 300 from the formation of condensation therein. Likewise, when it is detected that the door or other access panel is closed, the heating mechanism 306 may be deactivated, thereby allowing the data storage drive 300 to return to its normal operating temperature and resume normal operation.

As noted above, the service mode may be initiated prior to allowing a technician or other personnel to enter into the interior of the library to service and/or replace one or more library components, or, alternatively, it may be initiated any time an access door or other access panel on the data storage library is opened, or is to be opened. In order to determine if and when it is acceptable to open a library access door or otherwise allow personnel to enter the data storage library, it may be important to not only understand the temperature differential between the interior environment and exterior environment, but also the relative humidity (RH) of at least the exterior environment. If the interior temperature of the data storage library ($T_{library}$) is less than the dew point temperature ($T_{dew}$) for the exterior temperature ($T_{air}$), then the possibility exists for condensation to form on components within the data storage library if an access door or other panel is opened for service, allowing an influx of external air to enter the data storage library. This is because condensation may form and/or accumulate on various surfaces within the interior of the data storage library if the temperature within the data storage library (and/or components thereof) is at or below the dew point temperature of the surrounding room. Thus, in accordance with another aspect of the disclosure, the dew point temperature of the surrounding, exterior environment may be determined, which, in turn, may determine if and when the interior of the data storage library may be accessed for service.

Figure 10:
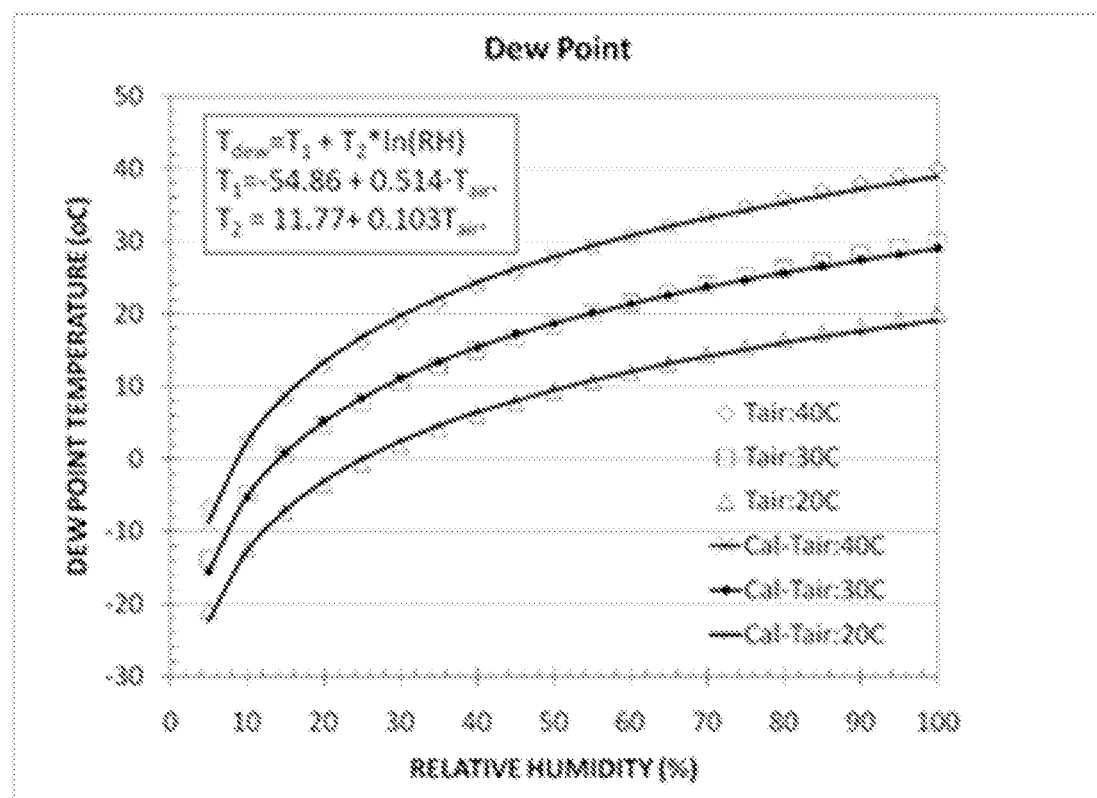
FIG. 10 is a graphical representation of relative humidity versus dew point temperature for certain exterior air temperatures.

Referring to FIG. 10, a graph depicting dew point temperature versus relative humidity for several exterior temperature values ($T_{air}$=200° C., 30° C., and 40° C.) is illustrated. As FIG. 10 shows, the higher the relative humidity, the closer the dew point temperatures are to the exterior air temperature values. Thus, in order to resist, impede and/or avoid the formation of condensation within the data storage library (or specific components thereof) due to humid air from the exterior entering the storage library during service procedures, it may be important to take into account not only the exterior air temperature, but also the relative humidity of the surrounding exterior environment.

In order to determine the dew point temperature of the exterior environment ($T_{dew}$), the temperature of the exterior air ($T_{air}$) and relative humidity of the exterior air (RH) must be determined via, for example, one or more sensors 1050 located exterior to the data storage library, as shown and described above with respect to FIG. 7. The dew point temperature $T_{dew}$ may be determined based on Equation 1, set forth below:

$$T_{dew} = -54.86 + 0.514 \cdot T_{air} + [11.77 + 0.103 * T_{air}] \cdot \ln(RH) \quad (1)$$

The processor may be programmed to run the equation before or during a service mode.

Alternatively, and/or additionally, dew point temperature $T_{dew}$ for the exterior of the library may be more generally determined based a look-up table. The interior temperature of the data storage library ($T_{library}$) may be determined via one or more interior sensors 1028, again shown and described with respect to FIG. 7.

Where the interior temperature of the library ($T_{library}$) is less than the dew point temperature ($T_{dew}$) for the exterior air, a library controller (such as controller 400 described above) or other mechanism may operate to restrict access to the data storage library by a technician, either through providing one or more visual and/or audible warning indicators, automatically locking the access doors, etc. However, once the interior temperature ($T_{library}$) has risen to a temperature greater than the dew point temperature ($T_{dew}$) for the exterior temperature ($T_{air}$), access into the data storage library for service and/or replacement of components may be allowed, as condensation formation on interior data storage library components should not occur. To provide a measure of protection against condensation, a predetermined margin for error may be incorporated into the calculation of an acceptable interior temperature ($T_{library}$), such as 1° C. to 5° C. greater than the calculated dew point temperature ($T_{dew}$).

While it may be ideal for the entire interior library temperature ($T_{library}$) to be greater than the dew point temperature ($T_{dew}$) prior to allowing access into the interior of the data storage library for service, in accordance with an aspect of the disclosure, it may be adequate to only increase the temperature within the one or more data storage drives such that the tape heads, data storage cartridges, and other sensitive components within the data storage drives reach a temperature above the dew point temperature ($T_{dew}$) during a service mode. The temperature within the data storage drive(s) may be increased through any appropriate means, including the methods described above with respect to FIGS. 8-9. For example, maintaining power to the read element(s) will locally heat the read elements and the immediately surrounding material, thereby offering added protection to the read elements against condensation forming on these highly moisture sensitive electronic elements. In this way, the sensitive components such as the tape head(s) within the data storage drive(s) may be maintained at a temperature above the dew point temperature ($T_{dew}$) of the exterior air, thereby allowing the data storage library to be accessed by a technician or other personnel without the formation of condensation on at least the components within the data storage drive. Maintaining power to other drive components, such as the motor or electronics cards will locally heat the interior of the drive, offering further protection to the components of the drive.

Figure 11:
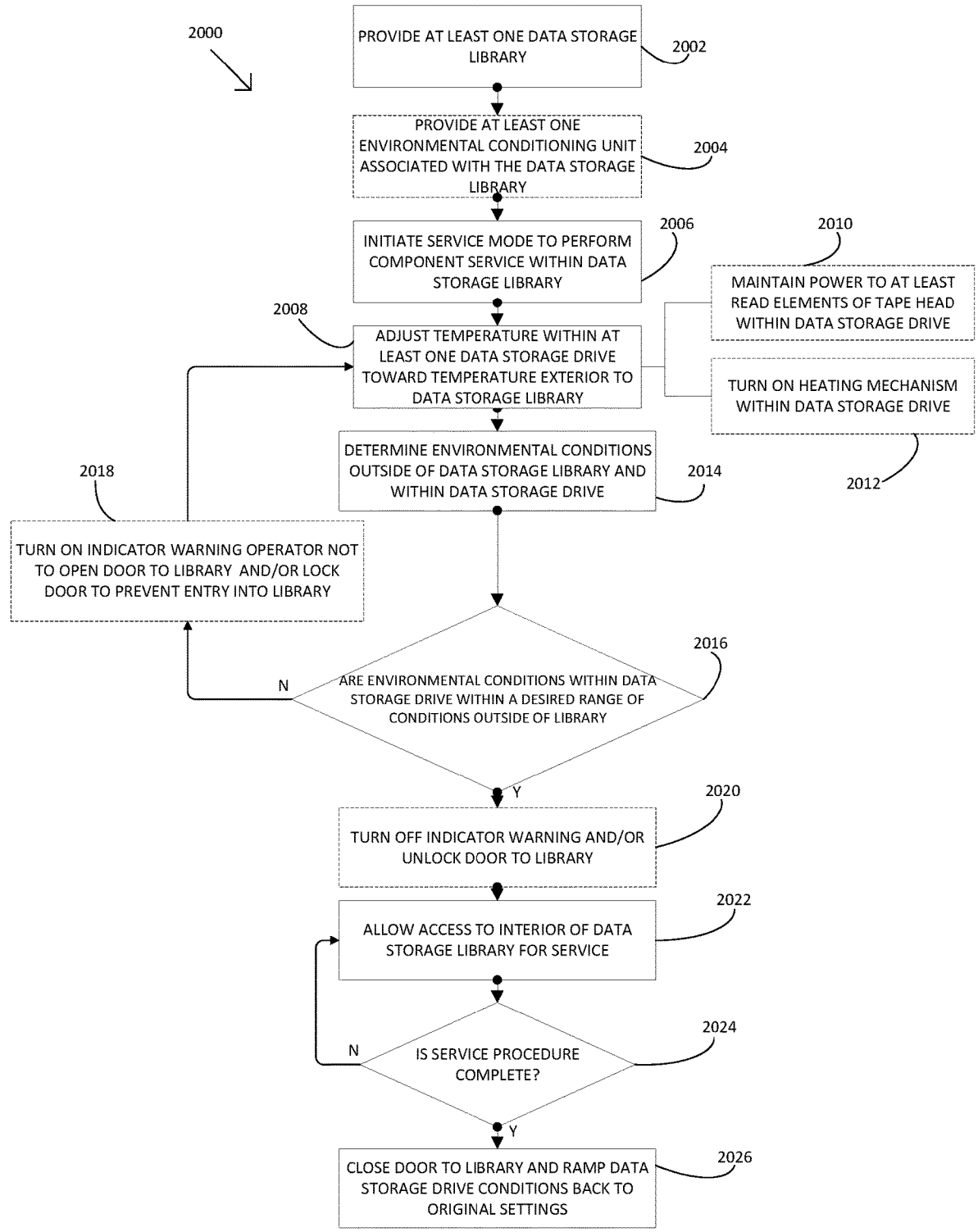
FIG. 11 is a flowchart of one embodiment of a method for providing a service mode for an automated data storage library.

Next, referring to FIG. 11, a service mode process 2000 for performing a service procedure within a data storage library in accordance with one aspect of the disclosure is illustrated. While process 2000 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 11, but may be performed as an integrated process, a series of steps, in the order described or in an alternative order.

At 2002, at least one data storage library is provided. At 2004, the at least one data storage library is provided with at least one environmental conditioning unit associated therewith, wherein the environmental conditioning unit is capable of controlling and/or regulating the temperature and/or humidity within the data storage library. At 2006, a service mode is initiated when component service and/or replacement is needed within the data storage library. As noted above, the service mode may be initiated automatically and/or manually. At 2008, the temperature within at least one data storage drive contained within the data storage library is adjusted (or ramped) toward the temperature of the environment outside of the data storage library. This adjustment in temperature may be made, for example, by maintaining power to at least the read element(s) of the tape head within the at least one data storage drive at 2010, and/or by turning on a heating mechanism within the data storage drive at 2012.

The interior environmental conditions within the data storage drive(s) and the exterior environmental conditions are determined at 2014. At 2016, if the environmental conditions within the data storage drive are determined to be outside of a predetermined suitable range, an indicator may be turned on, warning the operator not to open the door, and/or the door may be (or remain) locked at step 2018. As disclosed above, the indicator may be one or more of a visual indicator or audible indicator. However, if the environmental conditions are within a desired and/or suitable range, the indicator may be turned on or off and/or the door to the library may be unlocked at 2020. Accordingly, a technician or other personnel accesses or is permitted access into the interior of the data storage library frame(s) at 2022 to perform a service procedure.

A determination is made whether or not the service procedure is complete at 2024. If no, continued access to the interior of the data storage library for service and/or replacement of one or more components is permitted. However, if yes, the conditions within the data storage drive(s) may be ramped back to their original settings at 2026. In one aspect, the determination of whether the service has been performed is made or determined when the access panel is shut, and in response thereto the conditions within the library can return to their original and/or operational settings. In this way, the interior of data storage drive(s) may be conditioned to be within recommended operational conditions of the components contained therein when the library is not in a service mode.

Figure 12:
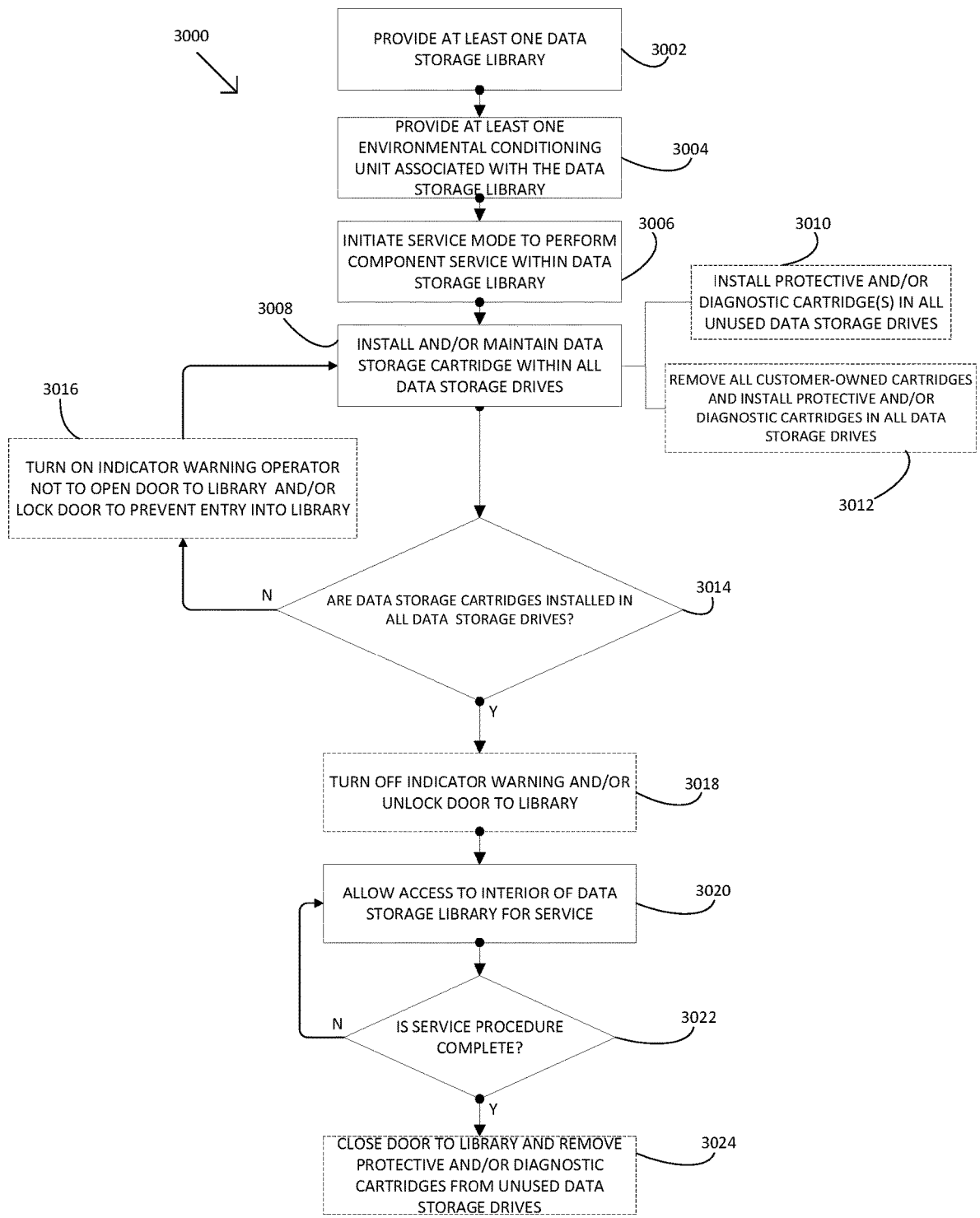
FIG. 12 is a flowchart of another embodiment of a method for providing a service mode for an automated data storage library.

Referring now to FIG. 12, a service mode process 3000 for performing a service procedure within a data storage library in accordance with another aspect of the disclosure is illustrated. While process 3000 is described for the sake of convenience and not with the intent of limiting the disclosure as comprising a series and/or number of steps, it is to be understood that the process does not need to be performed as a series of steps and/or the steps do not need to be performed in the order shown and described with respect to FIG. 12, but may be performed as an integrated process, a series of steps, in the order described or in an alternative order.

At 3002, at least one data storage library is provided. At 3004, the at least one data storage library is provided with at least one environmental conditioning unit associated therewith, wherein the environmental conditioning unit is capable of controlling and/or regulating the temperature and/or humidity within the data storage library. At 3006, a service mode is initiated when component service and/or replacement is needed within the data storage library. As noted above, the service mode may be initiated automatically and/or manually. At 3008, at least one cartridge, e.g. data storage cartridge, protective cartridge, and/or diagnostic cartridge, is installed (or maintained) within all data storage drives present within the data storage library. With at least one data storage cartridge installed in all data storage drives, the tape heads (and particularly the read elements of the tape heads) are provided with a physical barrier to protect against the formation of condensation and other forms of contamination. In some embodiments, protective and/or diagnostic cartridges may be installed within all unused data storage drives at 3010, with the customer-supplied cartridges remaining installed within the data storage drives if in use during initiation of the service mode. In other embodiments, all customer-owned cartridges may be removed from the data storage drives, with only protective and/or diagnostic cartridges being installed in all data storage drives during the service mode at 3012.

A determination is made whether or not cartridges are installed in all data storage drives at 3014. At 3016, if cartridges are not installed in all data storage drives, an indicator may be turned on, warning the operator not to open the door, and/or the door may be (or remain) locked. As disclosed above, the indicator may be one or more of a visual indicator or audible indicator. However, if cartridges are installed in all data storage drives, the indicator may be turned on or off and/or the door to the library may be unlocked at 3018. Accordingly, the technician or other personnel accesses or is permitted to access the interior of the data storage library frame(s) at 3020 to perform a service procedure.

A determination is made whether or not the service procedure is complete at 3022. If no, continued access into the interior of the data storage library for service and/or replacement of one or more components is permitted. However, if yes, the protective and/or diagnostic cartridges that had been installed in unused data storage drives are removed at 3024. In one aspect, the determination of whether the service is complete is made or determined when the access panel door is shut, and in response the protective and/or diagnostic cartridges are removed.

It follows that various embodiments described and/or suggested herein are able to provide data storage systems, more specifically, automated data storage libraries having climate control capabilities associated and/or integrated with the automated data storage library, with a service mode for regulating the interior environmental conditions within the data storage library based on the corresponding external environmental conditions and/or regulating access to the interior of the data storage library based on internal and external environmental conditions. As a result, favorable conditions (e.g., temperature, humidity, presence of contaminants, etc.) may be maintained for the data storage drives, data storage cartridges, etc., which may be stored in the library frames, while the formation and/or accumulation of condensation on the data storage library components (and particularly components within the one or more data storage drives) may be inhibited, impeded, resisted and/or avoided.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of servicing a data storage library, the method comprising:
   providing a data storage library having at least one data storage drive;
   initiating a service mode of the data storage library at at least one of a group consisting of: prior to a service procedure being performed within the data storage library, during a service procedure being performed within the data storage library, and combinations thereof;
   determining if at least one environmental condition within the at least one data storage drive is within a desired range of the at least one environmental condition outside of the data storage library; and
   permitting access into the data storage library if the at least one environmental condition within the at least one data storage drive is within the desired range of the at least one environmental condition outside of the data storage library.

2. The method of claim 1, further comprising adjusting the at least one environmental condition within the at least one data storage drive to be within the desired range of the at least one environmental condition outside of the data storage library.

3. The method of claim 2, wherein the at least one environmental condition comprises at least one of a group consisting of: temperature, relative humidity, and combinations thereof, and adjusting the at least one environmental condition includes adjusting the temperature by performing at least one of a group consisting of: maintaining power to a drive head within the data storage drive, heating an interior of the at least one data storage drive, providing a physical barrier over or between the drive head of the at least one data storage drive, inserting or maintaining at least one data storage cartridge with the at least one data storage drive, and combinations thereof.

4. The method of claim 1, further comprising at least one of a group consisting of: providing an indicator that identifies when at least one access door to the data storage library should not be opened, locking the at least one access door to the data storage library, and combinations thereof in response to the at least one environmental condition within the at least one data storage drive not being within the desired range of the at least one environmental condition outside of the data storage library.

5. The method of claim 1, further comprising, during at least a period of the service mode, performing at least one of a group consisting of: ramping at least one environmental condition within an interior of the data storage library toward the at least one environmental condition within the at least one data storage drive, ramping at least one environmental condition within the at least one data storage drive toward the at least one environmental condition within the interior of the data storage library, and combinations thereof.

6. The method of claim 1, further comprising, during at least a period of the service mode, performing at least one of a group consisting of: ramping the at least one environmental condition within an interior of the data storage library toward the at least one environmental condition outside the data storage library, ramping the at least one environmental condition outside the data storage library toward the at least one environmental condition within the interior of the data storage library, and combinations thereof.

7. The method of claim 1, further comprising:
   receiving measurements of the at least one environmental condition from one or more sensors wherein the one or more sensors measure the at least one environmental condition of at least one of a group consisting of: an interior of the data storage library, an interior of the at least one data storage drive, an exterior of the data storage library, and combinations thereof; and
   using the received measurements to determine if the at least one environmental condition within the at least one data storage drive is within the desired range.

8. The method of claim 1, further comprising maintaining at least a portion of an interior of the at least one data storage drive above a dew point temperature based upon the relative humidity and temperature outside of the data storage library.

9. The method of claim 1, further comprising, during at least a period of the service mode, in response to the at least one environmental condition within the at least one data storage drive not being within the desired range providing at least one of a group consisting of: preventing opening of at least one access door, indicating that the at least one access door should not be opened, and combinations thereof.

10. The method of claim 9, further comprising locking the at least one access door to prevent access into the interior of the data storage library during at least the period of the service mode.

11. The method of claim 1, further comprising maintaining or inserting at least one data storage cartridge within the at least one data storage drive during at least a period of the service mode.

12. A method of servicing a data storage library comprising:
providing a data storage library having at least one data storage drive;
initiating a service mode of the data storage library at at least one of a group consisting of: prior to a service procedure being performed within the data storage library, during a service procedure being performed within the data storage library, and combinations thereof;
modifying, during at least a period of the service mode, at least one environmental condition within the at least one data storage drive;
determining during the service mode if the at least one environmental condition within the at least one data storage drive is within the desired range of the at least one environmental condition outside of the data storage library; and
permitting access into the data storage library during the service mode if the at least one environmental condition within the at least one data storage drive is within the desired range of the at least one environmental condition outside of the data storage library.

13. The method of claim 12, wherein the at least one environmental condition comprises at least one of a group consisting of: temperature, relative humidity, and combinations thereof, and the method further comprising ramping the temperature within the at least one data storage drive toward a dew point temperature outside of the data storage library.

14. The method of claim 12, further comprising restricting access to an interior of the data storage library during at least a period of the service mode until the at least one environmental condition within the at least one data storage drive is within the desired range of the at least one environmental condition outside of the data storage library.

15. The method of claim 12, further comprising maintaining power to the data storage drive during at least a period of the service mode in order to modify the at least one environmental condition within the at least one data storage drive toward the at least one environmental condition outside of the data storage library.

16. The method of claim 12, wherein modifying, during at least a period of the service mode, the at least one environmental condition within the at least one data storage drive comprises at least one of a group consisting of: maintaining power to a drive head within the data storage drive, heating an interior of the at least one data storage drive, providing a physical barrier over or between the drive head of the at least one data storage drive, inserting or maintaining at least one data storage cartridge with the at least one data storage drive, and combinations thereof.

17. A method of servicing a data storage library, the method comprising:
providing a data storage library having at least one data storage drive;
initiating a service mode of the data storage library at at least one of a group consisting of: prior to a service procedure being performed within the data storage library, during a service procedure being performed within the data storage library, and combinations thereof;
determining if at least one environmental condition within the at least one data storage drive is within a desired range of the at least one environmental condition outside of the data storage library; and
determining whether to change at least one operational state within the at least one data storage drive based upon whether the at least one environmental condition within the at least one data storage drive is within the desired range of the at least one environmental condition outside of the data storage library.

18. The method of claim 17, wherein the environmental condition consists of at least one of a group consisting of temperature, relative humidity, and combinations thereof, the method further comprising adjusting the at least one environmental condition within the at least one data storage drive to be within the desired range of the environmental condition outside of the data storage library.

19. The method of claim 17, wherein changing the at least one operational state within the at least one data storage drive comprises at least one of a group consisting of: maintaining power to a drive head within the data storage drive, heating an interior of the at least one data storage drive, providing a physical barrier over or between the drive head of the at least one data storage drive, inserting or maintaining at least one data storage cartridge with the at least one data storage drive, and combinations thereof.

20. The method of claim 17, wherein the at least one environmental condition is temperature, and the method further comprising at least one of a group consisting of: providing an indicator to identify when at least one access door to the data storage library should not be opened, locking the at least one access door to the data storage library, and combinations thereof in response to a temperature within the at least one data storage drive not being within a desired range of the temperature outside of the data storage library.

* * * * *